(12) United States Patent
Mannhart et al.

(10) Patent No.: US 11,595,133 B2
(45) Date of Patent: Feb. 28, 2023

(54) NON-RECIPROCAL DEVICE COMPRISING ASYMMETRIC PHASE TRANSPORT OF WAVES

(71) Applicant: Max-Planck-Gesellschaft Zur Förderung Der Wissenschaften E.V., Munich (DE)

(72) Inventors: Jochen Mannhart, Böblingen (DE); Daniel Braak, Augsburg (DE)

(73) Assignee: Max-Planck-Gesellschaft Zur Förderung Der Wissenschaften E.V., Munich (DE)

( * ) Notice: Subject to any disclaimer, the term of this patent is extended or adjusted under 35 U.S.C. 154(b) by 147 days.

(21) Appl. No.: 17/256,596

(22) PCT Filed: Apr. 5, 2019

(86) PCT No.: PCT/EP2019/058649
§ 371 (c)(1),
(2) Date: Dec. 28, 2020

(87) PCT Pub. No.: WO2020/001822
PCT Pub. Date: Jan. 2, 2020

(65) Prior Publication Data
US 2021/0273733 A1    Sep. 2, 2021

(30) Foreign Application Priority Data

Jun. 29, 2018 (EP) .................................... 18180759

(51) Int. Cl.
*H04B 10/00*    (2013.01)
*H04B 10/70*    (2013.01)
(Continued)

(52) U.S. Cl.
CPC .............. *H04B 10/70* (2013.01); *G01B 9/02* (2013.01); *H01P 1/32* (2013.01); *G01B 2290/55* (2013.01)

(58) Field of Classification Search
CPC ..................................................... H04B 10/70
See application file for complete search history.

(56) References Cited

U.S. PATENT DOCUMENTS 7,903,255 B2    3/2011  Kaplan
2008/0138087 A1  6/2008  Snyder
(Continued)

FOREIGN PATENT DOCUMENTS

CN    111505766 A    8/2020
JP    62-040071 A    2/1987
(Continued)

OTHER PUBLICATIONS

Sollner et al. "Deterministic photon-emitter coupling in chiral photonic circuits". Nature Nanotechnology, vol. 10, Sep. 2015, pp. 775-778.
Gonzales-Ballestero et al. "Nonreciprocal few-photon routing schemes based on chiral waveguide-emitter couplings". Physical review A, vol. 94, Dec. 2016, pp. 1-14.
(Continued)

*Primary Examiner* — Daniel G Dobson
(74) *Attorney, Agent, or Firm* — TraskBritt

(57) ABSTRACT

A quantum device includes a non-reciprocal transmission structure, wherein the transmission structure is designed such that for first waves traversing the transmission structure in a forward direction the phases of the first waves are at least partially conserved, and for second waves traversing the transmission structure in a backward direction, the phases of the second waves are at least partially replaced by random ones, such that the phase conservation is more
(Continued)

pronounced in the forward direction than in the backward direction.

20 Claims, 11 Drawing Sheets

(51) Int. Cl.
   *G01B 9/02* (2022.01)
   *H01P 1/32* (2006.01)
   *H04J 14/00* (2006.01)

(56) References Cited

U.S. PATENT DOCUMENTS

| | | |
|---|---|---|
| 2009/0046294 A1 | 2/2009 | Kaplan |
| 2010/0134802 A1 | 6/2010 | Chan et al. |
| 2012/0128350 A1 | 5/2012 | Popovic |
| 2012/0189246 A1 | 7/2012 | Hofrichter et al. |
| 2012/0287497 A1 | 11/2012 | Takamatsu et al. |
| 2021/0349191 A1 | 11/2021 | Bi et al. |

FOREIGN PATENT DOCUMENTS

| | | |
|---|---|---|
| JP | 05-142755 A | 6/1993 |
| JP | 2003-302603 A | 10/2003 |
| JP | 2009-041946 A | 2/2009 |
| JP | 2012-256026 A | 12/2012 |
| JP | 2013-504087 A | 2/2013 |

OTHER PUBLICATIONS

Mitsuya et al. "Demonstration of a Silicon Waveguide Optical Circulator" IEEE Photonics Technology Letters, vol. 25., No. 8, Apr. 2013, pp. 721-723.
European Extended Search Report and Opinion for European Application No. 18180759.5, dated Dec. 19, 2018, 9 pages.
International Search Report for International Application No. PCT/EP2019/058649, dated Jun. 7, 2019, 5 pages.
International Written Opinion for International Application No. PCT/EP2019/058649, dated Jun. 7, 2019, 7 pages.
European Communication pursuant to Article 94(3) EPC for European Application No. 19714454, dated May 31, 2022, 7 pages.
Japanese Notice of Reasons for Refusal for Japanese Application No. 2020-573272, dated Jul. 5, 2022, 8 pages with English translation.
Sugimoto et al. "Waveguide polarization-independent optical circulator". IEEE Photonics Technology Letters (US), vol. 11, No. 3, Mar. 1999, pp. 355-357.
Japanese Notice of Reasons for Refusal for Japanese Application No. 2020-573272, dated Mar. 8, 2022, 13 pages with English translation.

NON-RECIPROCAL DEVICE COMPRISING ASYMMETRIC PHASE TRANSPORT OF WAVES

CROSS-REFERENCE TO RELATED APPLICATIONS

This application is a national phase entry under 35 U.S.C. § 371 of International Patent Application PCT/EP2019/058649, filed Apr. 5, 2019, designating the United States of America and published as International Patent Publication WO 2020/001822 A1 on Jan. 2, 2020, which claims the benefit under Article 8 of the Patent Cooperation Treaty to European Patent Application Serial No. 18180759.5, filed Jun. 29, 2018.

TECHNICAL FIELD

The present disclosure relates to a quantum device comprising a non-reciprocal transmission structure. The disclosed quantum device comprises a transmission asymmetry, which is based on asymmetric phase transport of waves. The present disclosure also relates to a method for operating such a quantum device and to a use of one or more of such quantum devices in a lot of different devices.

BACKGROUND

For illustrating background art reference is made to the following prior art:
1. D. M. Pozar, *Microwave Engineering*, J. Wiley and Sons, 4th ed. (2012).
2. N. Bahlmann, M. Lohmeyer, M. Wallenhorst, H. Dotsch, and P. Hertel, Optical and Quantum Electronics 30, 323 (1998).
3. R. J. Potton, Rep. Prog. Phys. 67, 717 (2004).
4. R. Fleury, D. L. Sounas, C. F. Sieck, M. R. Haberman, and A. Alù, Science 343, 518 (2014).
5. A. A. Mukhin, A. M. Kuzmenko, V. Yu Ivanov, A. G. Pimenov, A. M. Shuvaev, and V. E. Dziom, Physics-Uspekhi 58, 993 (2015).
6. A. C. Mahoney et al., Phys. Rev. X 7, 011007 (2017).
7. J. Mannhart, J. Supercond. Novel. Magn. 31, 1649 (2018). (2018).
8. É. I. Rashba, Sov. Phys. Solid State 2, 1109 (1960).
9. T. Chakraborty, A. Manaselyan, and M. Barseghyan, "*Electronic, Magnetic, and Optical Properties of Quantum Rings in Novel Systems,*" in V. M. Fomin, "Physics of Quantum Rings" (Springer, 2018).
10. Y. Aharonov and D. Bohm, Phys. Rev. B 115, 485 (1959).
11. M. Planck, Verhandlungen der Deutschen Physikalischen Gesellschaft 2, 245 (1900).
12. C. Elouard, D. Herrera-Marti, B. Huard, and A. Auffèves, Phys. Rev. Lett. 118, 260603 (2017).
13. N. Cottet et al., PNAS 114, 7561 (2017).
14. J. C. Maxwell, *Theory of Heat*, Longmans, Green, and Co. (1871).
15. Th. M. Nieuwenhuizen, A. E. Allahverdyan, Phys. Rev. E, 036102 (2002).
16. Z. Merali, Nature 551, 20, (2017)
17. C. Cohen-Tannoudji, B. Diu, F. Laloe, *Quantum Mechanics*, Wiley, 2005
18. L. E. Reichl, "A Modern Course in Statistical Physics," E. Arnold, 1980
19. V. Capek and D. P. Sheehan, "Challenges to the Second Law of Thermodynamics," Springer 2005
20. Y. Imry, "*Introduction to Mesoscopic Physics,*" Oxford University Press (2002)
21. P. Lodahl et al., Nature 541, 473 (2017).

Non-reciprocal devices, i.e., devices that let waves pass differently in one direction than in the other, are widely used in radar technology [1] and optics [3]. They have also been implemented, for example, as devices based on plasmons, magnons, electromagnons, and sound waves (see, e.g., [2-6]). Non-reciprocal devices for de Broglie waves can be realized [7] by using Rashba quantum rings [8,9] or asymmetric Aharonov-Bohm rings [10]. Based on interference of the particles' wave functions, these devices let particles pass preferentially in one direction.

BRIEF SUMMARY

In accordance with a first aspect of the present disclosure, a quantum device comprises a non-reciprocal transmission structure, wherein the transmission structure is designed such that for first waves traversing the transmission structure in a forward direction the phases of the first waves are at least partially conserved, and for second waves traversing the transmission structure in a backward direction, the phases of the second waves are at least partially replaced by random ones, such that the phase conservation is more pronounced in the forward direction than in the backward direction.

In accordance with a second aspect of the present disclosure a method for operating a quantum device according to the first aspect comprises supplying the first waves to the quantum device, wherein the first waves comprise quanta with energies obtained from a thermal source or with energies E of order kT, such that kT/10<E<10 kT, wherein T is the temperature of the environment.

In accordance with a third aspect of the present disclosure, one or more quantum devices according to the first aspect are used in one or more of:
  a device in which the first waves comprise quanta with energies obtained from a thermal source or with energies E of order kT, such that kT/10<E<10 kT, wherein T is the temperature of the environment;
  a device utilizing coherent emission and at least partial collapses of wave functions to achieve a deviation from one or more of the zeroth law, the second, or the third law of thermodynamics;
  a device utilizing quantum-mechanical superposition of states and at least partial collapses of wave functions to achieve a deviation from one or more of the zeroth, the second, or the third law of thermodynamics;
  a device utilizing coherent emission and at least partial quantum-physical collapses of wave functions or quantum-mechanical superposition of states and at least partial collapses of wave functions to generate or to enhance inhomogeneities in the density of the energy distribution of waves or particles in a system;
  a device utilizing coherent emission and at least partial quantum-physical collapses of wave functions or quantum-mechanical superposition of states and at least partial collapses of wave functions to shift a system out of the state of thermal equilibrium;
  a device utilizing coherent emission and at least partial quantum-physical collapses of wave functions or quantum-mechanical superposition of states and at least partial collapses of wave functions to generate temperature differences within one body or between several bodies;
  a device comprising an interferometer; and a device comprising analog or digital systems for quantum computation, quantum data transmission, or quantum data storage;

a device comprising an interferometer;

a device performing quantum computation, quantum data transmission, quantum data storage, heating, cooling, matter transport, energy transport, or power generation.

The person skilled in the art recognizes additional features and advantages upon reading the following detailed description and upon giving consideration to the accompanying drawings.

BRIEF DESCRIPTION OF THE DRAWINGS

The accompanying drawings are included to provide a further understanding of examples and are incorporated in and constitute a part of this specification. The drawings illustrate examples and together with the description serve to explain principles of examples. Other examples and many of the intended advantages of examples will be readily appreciated as they become better understood by reference to the following detailed description.

FIG. 3 shows a time sequence of a wave travelling in FIG. 3A from a body A to a body B, and in FIG. 3B from a body B to a body A, with the value of the wave's phase denoted, wherein two black bodies C and D are inserted in the shown time sequence in the path between bodies A and B.

DETAILED DESCRIPTION

Figure 1:
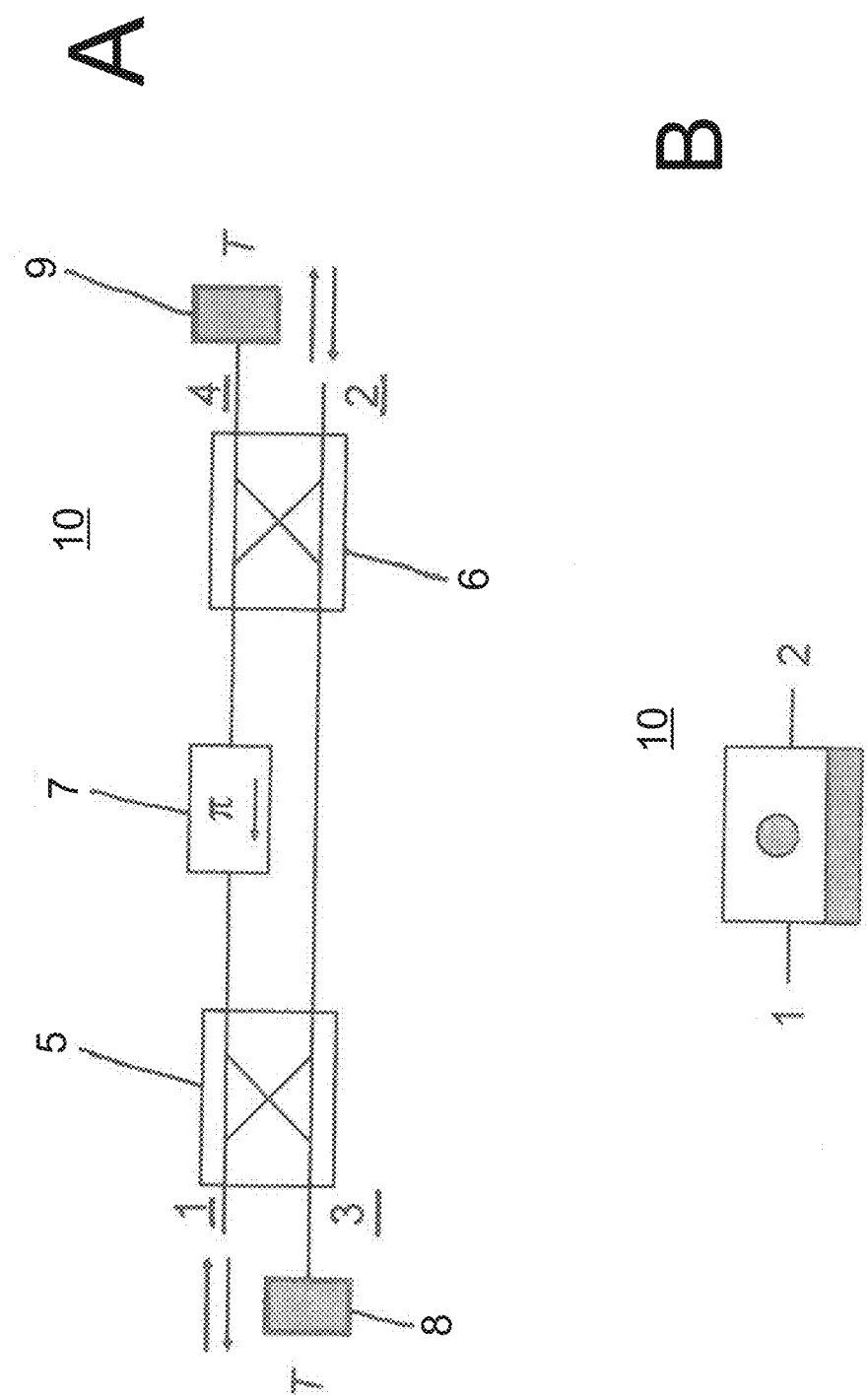
FIG. 1 comprises FIGS. 1A and 1B and shows a schematic block representation (A) and a symbolic representation (B) of a first embodiment of a quantum device according to the first aspect, which embodiment is based on a four-port circulator comprising two hybrid couplers and a phase shifter connected between the hybrid couplers and two black-body radiators disposed at respective two ports.

In the following description the terms "coupled" and "connected," along with derivatives may be used. It should be understood that these terms may be used to indicate that two elements co-operate or interact with each other, regardless whether they are in direct physical or electrical contact, or they are not in direct or physical or electrical contact with each other, which means that there can be one or more intermediate elements between the two elements.

In the following the terms "absorber," "emitter" or "absorber/emitter" may be used. It should be understood that these terms are to be understood as any kinds of elements, which may absorb or emit any kind of waves, particles and quasi-particles and any kind of radiation. The terms particularly refer to black body radiators (see next paragraph), but also to e.g., resistors, which may absorb or emit electrons.

In the following the term "black body" and "black body radiators" along with derivatives may be used. It should be understood that the term is used to refer to bodies in a broad sense, to include also solids, liquids, gases, or plasmas that may emit or absorb thermal radiation. The body may not be 100% black (such bodies do not exist at all), and may not be designed as a textbook-like black body radiator consisting of a hollow body with a small opening.

The non-reciprocal devices described in the present disclosure break the symmetry of the phase conservation of objects depending on the direction with which these pass through the devices. The objects may be particles such as electrons or waves such as photons. Conserving the average energy and momentum of the object, these devices may act in forward direction like transparent or even open windows, but in reverse direction resemble black-body radiators, or more general absorbers/emitters, with incoherent output.

When describing and claiming a quantum device in the following, it should be noted that the term "quantum device" is to be understood in a broad and extensive manner. Concerning the function of the devices revealed here, such a device basically acts as a non-reciprocal filter for matter or electromagnetic waves, for example, for photons, particle waves, quasiparticle waves of any kind. Concerning its structure it can be understood as an artificial or man-made structure in which, for example, electrical wires or lines are fabricated by different technological methods, including integrated circuit technology. It can, however, also be understood as consisting of or comprising chemical components like, for example, molecules, molecule compounds, molecule rings like benzene rings with side groups, and so on. It furthermore can refer to solid compounds, e.g., with crystalline structures that exert the device function, or to structures fabricated in or from such crystalline structures.

In general there are no required external forces driving the particles into the devices besides a heat bath having a temperature T>0 K. Therefore in the examples of quantum devices shown and described in the following, the devices function due to the fact that the particles like photons or electrons are only excited or are only moving due to their thermal excitation.

Furthermore the term "transmission path" can be, but does not have to be understood as a material body. In some devices a material body, e.g., a piece of wire or a waveguide, may comprise one transmission path. In some other devices such a material body may comprise two transmission paths, namely two opposing directions of particles propagating through the material body. In some other devices the term is not to be understood as a tangible or material body, which is fabricated from a specific material. It is rather to be understood as a virtual path of a particle or wave in space, and may even be placed, e.g., in a gaseous atmosphere.

It is noted that as used in the following, one opening, such as one slit, may comprise multiple transmission paths. This becomes understood by regarding optical diffraction of one slit. Here the phase differences associated with the multitude of transmission paths passing through the slit at different positions or angles causes the characteristic single-slit diffraction pattern.

It is further noted that the terms "slit" and "double-slit" may refer to a multitude of geometries and systems. The openings of the slits may, for example, not be completely open and transparent. Also more than one or two slits may be used, which also may be configured, for example, as arrangements commonly described as zone-plates, metamaterials, or optical crystals.

Likewise, the term "atom" may refer to single atoms or molecules, but also to a multitude of atoms, molecules or particles with a characteristic behavior characterized by the behavior of single atoms, without or with the presence of superradiance. The term also comprises defects in solids, for example, color centers, that can absorb and emit waves in a manner as atoms do.

Also, the term "random" is used here to not only describe processes of completely random nature. The term is also used to describe, for example, distributions of phases that are so irregular that interference events between waves with such phases are significantly oppressed.

Furthermore, the term "phase coherent" does not necessarily imply that there is no inelastic, phase-breaking scattering taking place in the device. Indeed, as shown in FIG. 1 comprises FIGS. 1A and 1B and shows in FIG. 1A a schematic block representation of a quantum device according to a first embodiment. The quantum device 10 of FIG. 1A comprises a non-reciprocal transmission structure, which may be connected between a first port 1 and a second port 2. The transmission structure is designed such that for first waves traversing the transmission structure in a forward direction from the first port 1 to the second port 2 the phases of the first waves are conserved, and for second waves traversing the transmission structure in a backward direction from the second port 2 to the first port 1, the phases of the second waves are replaced by random ones, which are generated by the black bodies having the temperature T.

According to the example as shown in FIG. 1A, the transmission structure comprises a first hybrid coupler 5, a second hybrid coupler 6, and a phase shifter 7, wherein the two hybrid couplers 5 and 6 are interconnected and the phase shifter 7 is connected in-between the two hybrid couplers 5 and 6. According to the example as shown in FIG. 1A, the quantum device 10 comprises a four-port circulator comprising the first and second ports 1 and 2, a third port 3, and a fourth port 4. At each one of the third and fourth ports 3 and 4 an absorber/emitter 8 and 9 can be disposed. Such an absorber/emitter can be comprised of a black body radiator in case of an optical device using electromagnetic waves in, for example, the visible or infrared spectrum, or it can be comprised of a resistor in case of a microwave device using electromagnetic waves in, for example, the microwave region.

The principle function of the hybrid couplers 5 and 6 is, for example, described on page 322 ff. in Accordingly, the signal paths through the transmission structure will be described in the following FIGS. 2A to 2C.

Figure 2:
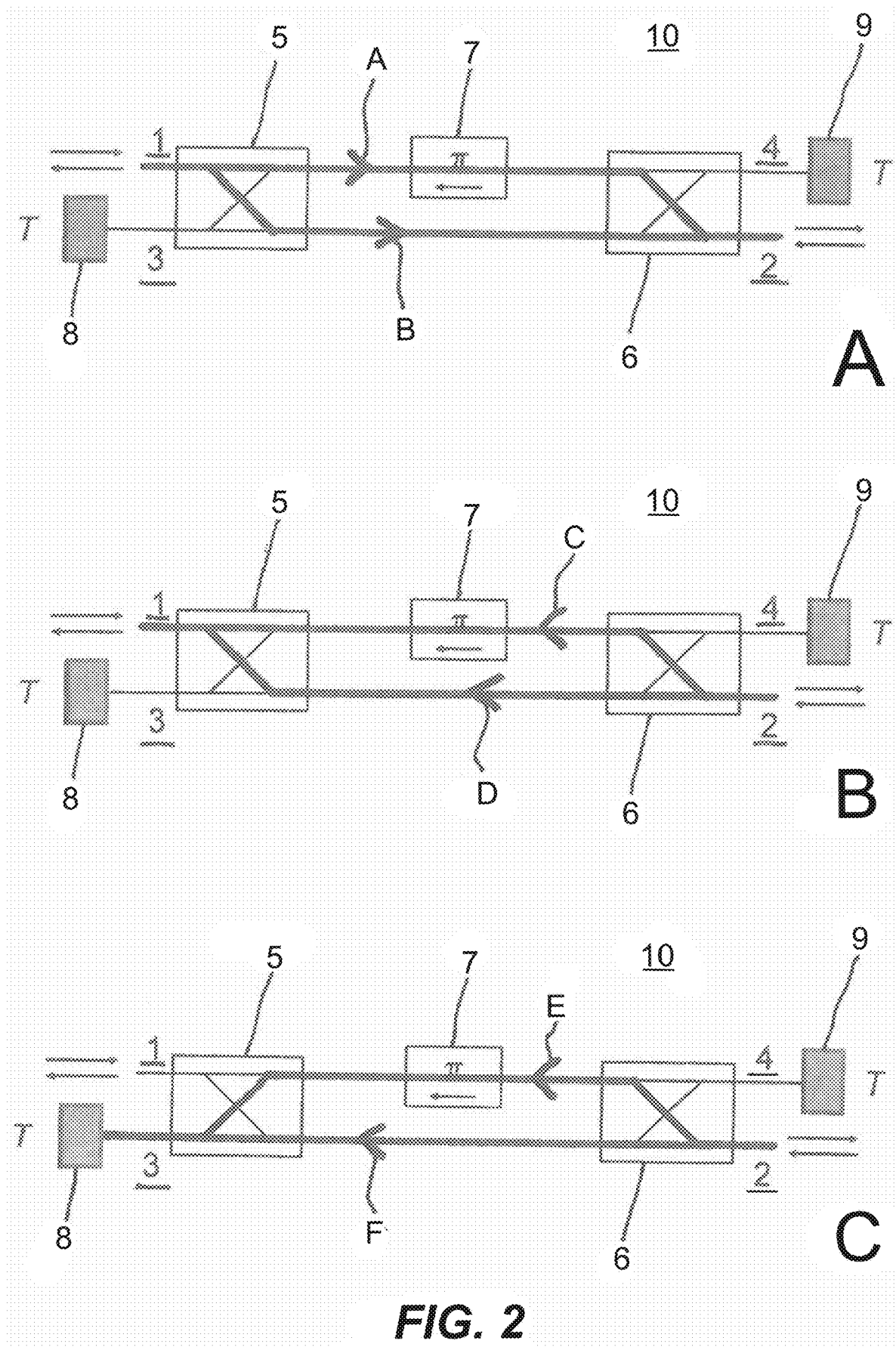
FIG. 2 comprises FIGS. 2A to 2C and shows the quantum device of FIG. 1 in which first transmission paths extending from a first port to a second port are marked (A), the quantum device of FIG. 1 in which second transmission paths extending from the second port to the first port are marked (B), and the quantum device of FIG. 1 in which third transmission paths extending from the second port to a third port are marked (C).

FIG. 2A shows the quantum device 10 of FIG. 1 in which two transmission paths are marked, which lead from the first port 1 to the second port 2. The first one of these transmission paths marked with the letter A experiences a total phase shift of $\pi/2$ as there is no phase shift when horizontally passing through the first hybrid coupler 5 and the phase shifter 7, but a phase shift of $\pi/2$ when passing through the second hybrid coupler 6. The second one of these transmission paths is marked with the letter B and experiences also a total phase shift of $\pi/2$. This phase shift results from the passing through the first hybrid coupler 5 imposing a phase shift of $\pi/2$ onto the signal, wherein there is no phase shift when passing through the second hybrid coupler 6. As a result, since both transmission paths A and B experience a phase shift of $\pi/2$, the respective waves interfere constructively when joining each other in the second hybrid coupler 6 and then leave the second hybrid coupler 6 at port 2.

FIG. 2B shows the quantum device 10 of FIG. 1 in which two transmission paths are marked, which lead from the second port 2 to the first port 1. The first one of these transmission paths marked with the letter C experiences a total phase shift of $3\times\pi/2$, as there is a first phase shift of $\pi/2$ when passing through the second hybrid coupler 6 and a second phase shift of it when passing through the phase shifter 7 and no phase shift when horizontally passing through the first hybrid coupler 5. The second one of these transmission paths marked with the letter D experiences a total phase shift of $\pi/2$, as there is no phase shift when horizontally passing through the second hybrid coupler 6 and a phase shift of $\pi/2$ when passing through the first hybrid coupler 5.

As the first transmission path C experiences a phase shift of $3\times\pi/2$ and the second transmission path D experiences a phase shift of $\pi/2$, the two transmission paths C and D will have a phase difference of it when joining each other in the first hybrid coupler 5, which means that they interfere destructively so that a zero signal will leave the device 10 at the first port 1.

FIG. 2C shows the quantum device 10 of FIG. 1 in which two transmission paths are marked, which lead from the second port 2 to the third port 3. The first one of these transmission paths marked with the letter E experiences a total phase shift of $2\pi$, as there is a first phase shift of $\pi/2$ when passing through the second hybrid coupler 6, a second phase shift of $\pi$ when passing through the phase shifter 7, and a third phase shift of $\pi/2$ when passing through the first hybrid coupler 5. The second one of these transmission paths is marked with the letter F. This path experiences a total phase shift of 0 as there is no phase shift when horizontally passing through the second hybrid coupler 6 and as well no phase shift when passing through the first hybrid coupler 5.

As the transmission path E experiences a phase shift of a and the transmission path F experiences a phase shift of 0, the two transmission paths E and F will have a phase difference of $2\pi$ when joining each other in the first hybrid coupler 5, which means that they interfere constructively and then leave the device 10 at the third port 3.

It should be added that the same situation, as illustrated in FIG. 2C, occurs for a wave entering the quantum device 10 at the third port 3 and propagates to the fourth port 4, which means that respective partial waves travelling on two transmission paths between the third port 3 and the fourth port 4 will interfere constructively when joining each other in the second hybrid coupler 6 and then leave the device 10 at the fourth port 4.

A wave fed into the quantum device 10 at the first port 1 is thus transmitted without distortion to the second port 2 and a wave fed into the quantum device 10 at the second port 2 will be absorbed by the absorber/emitter 8 disposed at the third port 3. The absorption induces a quantum-mechanical collapse of the wave function. It should be mentioned at this point that the quantum device can have another structure as that shown in FIG. 1. In particular, the hybrid couplers 5 and 6 can be either of different nature or may not even exist as will be shown later. Also the ports 3 and 4 do not have to be provided physically.

In general it should be mentioned that the quantum device can be configured such that it functions according to completely different principles as compared to the quantum device of FIG. 1. The quantum device of FIG. 1 is constructed as a static device and as such comprises an intrinsically asymmetric behavior. It is, however, also possible to construct a quantum device, which comprises movable elements so that the asymmetric behavior is achieved by a specifically controlled movement of these elements. It is furthermore possible to provide a quantum device, which does not comprise an intrinsic asymmetry but shows asymmetric behavior due to the fact that it is embedded in a specific setup or structure. Examples of the above will be shown and explained further below.

One further example of a quantum device according to the first aspect will be shown and explained in the following FIG. 3. And as will be shown further below, a simple form of a quantum device according to the first aspect may contain a transmission structure, which essentially comprises an inelastic scattering center for photons or electrons. It could also be realized by low-loss optical switches in case of photons or a low-loss electronic switches in case of electrons.

Figure 3:
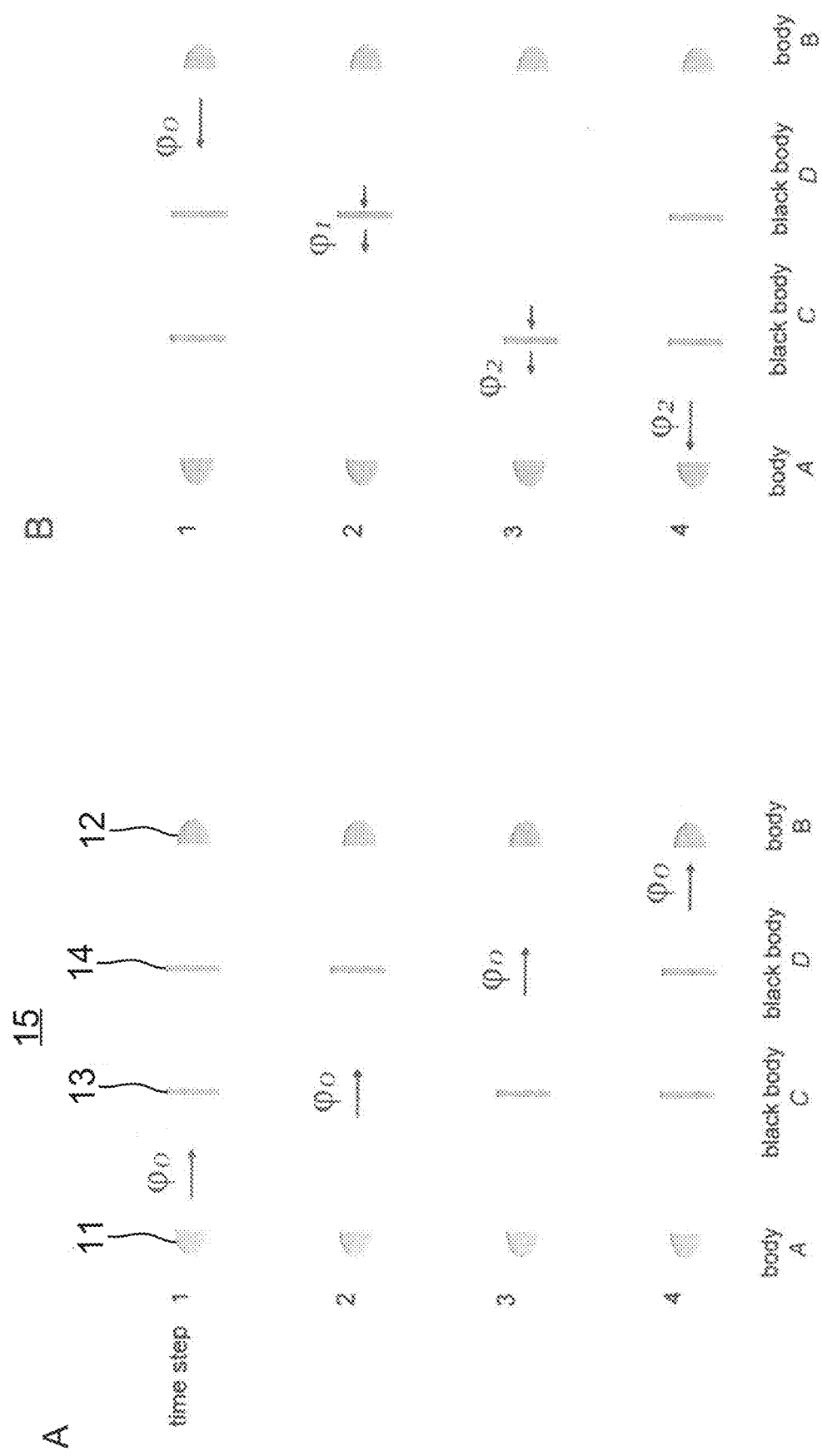
FIG. 3 comprises FIGS. 3A and 3B and illustrates a second embodiment of a quantum device according to the first aspect.

FIG. 3 comprises FIGS. 3A and 3B and shows a second embodiment of a quantum device according to the first aspect. The quantum device 15 of FIG. 3 comprises a first body 11, a second body 12, a first black body 13, and a second black body 14.

FIG. 3A illustrates the passage of a wave from the first body 11 to the second body 12 at four different time steps 1-4. FIG. 3B displays the transit of a wave from the second body 12 to the first body 11. The first and second bodies 11 and 12 can also be ports like the ports 1 and 2 of the embodiment of FIG. 1. The phases of the waves are denoted by $\varphi_n$ with n=0, 1, 2. The first and second black bodies 13 and 14 can be moved in and out of the path of the wave. They may, for example, be formed by appropriately shaped rotating disks.

As FIG. 3 illustrates, by appropriately moving the black bodies 13 and 14 in the right time sequence, a wave may pass unhindered from the first body 11 to the second body 12 as indicated by its constant phase $\varphi_0$ remaining unchanged. A wave traveling in backward direction, from the second body 12 to the first body 11, however, will be absorbed and statistically reemitted by at least one of the first and second black bodies 13 and 14. Due to the resulting wave function collapse, the information of the initial phase of the wave is lost. In the example shown in FIG. 3B, the wave having phase $\varphi_n$ is absorbed by the second black body 14, which reemits a wave with a random phase $\varphi_1$. This wave is then absorbed by the first black body 13, which reemits a wave with a random phase $\varphi_2$. It is pointed out that this embodiment may act on the complete frequency spectrum of a black-body radiator simultaneously.

A third embodiment of a quantum device according to the first aspect comprises a transmission structure comprising a body that with a probability p causes inelastic scattering and therefore phase information loss of a light wave wherein this embodiment will be described in more detail in connection with the embodiments of FIGS. 4, 5, 7, and 8.

According to a second aspect of the present disclosure a method for operating a quantum device according to the first aspect comprises supplying the first waves to the quantum device, wherein the first waves comprise quanta with energies obtained from a thermal source or with energies E of order kT, such that kT/10<E<10 kT, wherein T is the temperature of the environment.

A method for operating a quantum device according to the first aspect could alternatively or in addition be defined as comprising providing a source of the first waves, wherein the source of the first waves is held in thermal equilibrium with an environment. The environment can be a natural environment like a room being under room temperature, or a place in free nature. It can also be an artificial environment such as the cavity containing the device, or such as a thermal bath provided, for example, by a water bath or a hot oven.

A method for operating a quantum device according to the first aspect could alternatively or in addition be defined as comprising providing a source of the first waves, wherein the source of the first waves is not actively stimulated, in particular, not actively stimulated by non-thermal energy so that it would be possible that the source is actively heated or cooled.

In the following, possible applications of the quantum device according to the first aspect will be shown and described with respect to the FIGS. 4 to 9.

Figure 4:
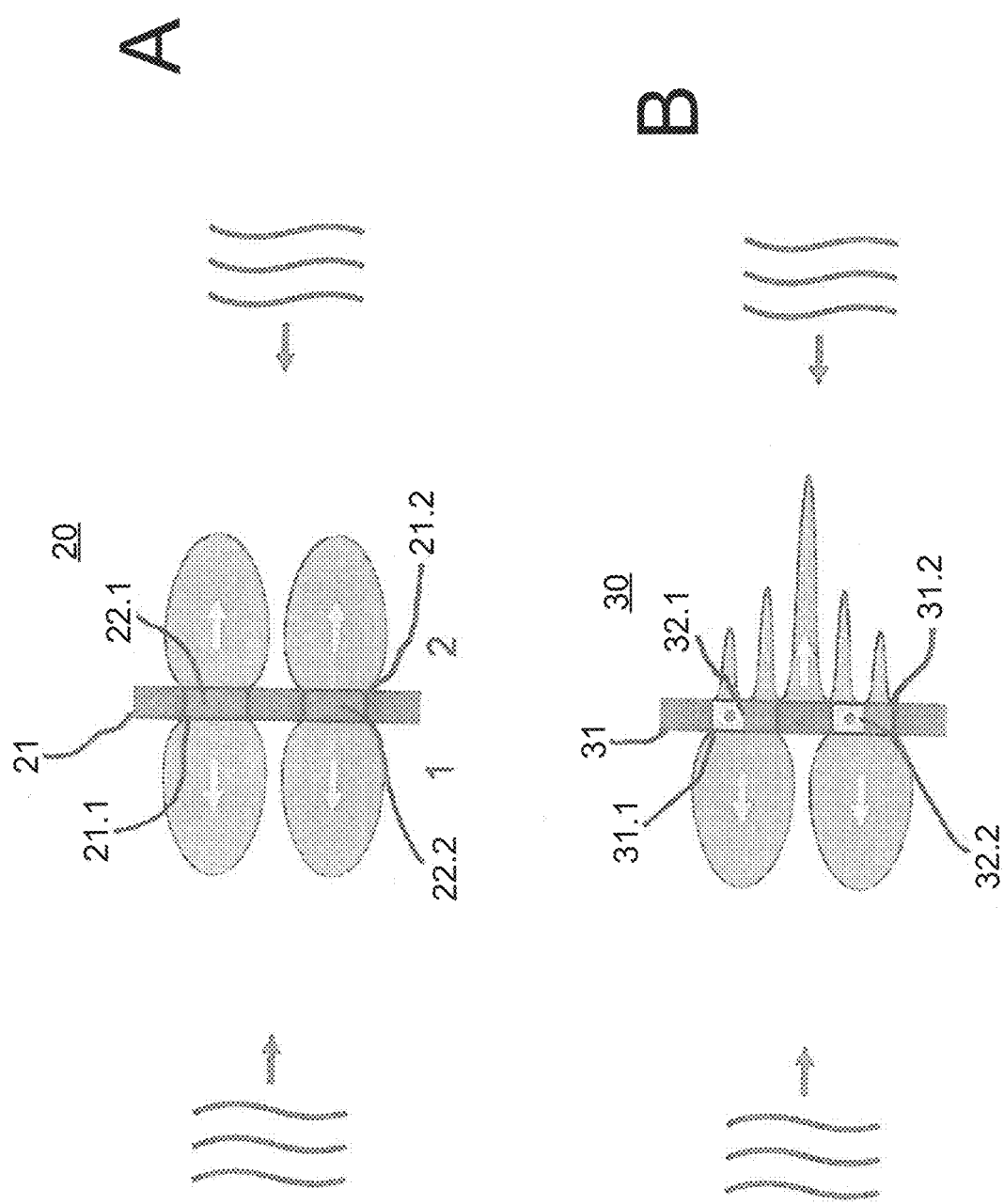
FIG. 4 comprises FIGS. 4A and 4B and shows for illustrative purposes an example of an optical double-slit interferometer in which the two slits are filled with black-body radiators (A), and an example of a double-slit interferometer in which the two slits are filled with quantum devices according to the first aspect (B).

FIG. 4 comprises FIGS. 4A and 4B and relates to the possibility to use the asymmetric phase transmission to create asymmetric interference.

FIG. 4A is intended only for illustrative purposes and shows an interferometer 20, which comprises an interferometer plate 21 and two slits 21.1 and 21.2 formed in a side-by-side relationship in the plate 21. The two slits 21.1 and 21.2 are filled with black-body radiators 22.1 and 22.2, respectively. It is further illustrated in the figure what happens when coherent radiation impinges onto the interferometer 20 from either one of the two sides of the plate 21. The two black-body radiators 22.1 and 22.2 will destroy the phases of the incident coherent waves and randomly emit another wave to the other side, the randomly emitted wave carrying a random new phase. As a result, the black-body radiators 22.1 and 22.2 will emit incoherent radiation to either sides of the plate 21 as it is indicated by the bubble-like radiation cones, which typically follows an angular dependence as described by Lambert's radiation law.

FIG. 4B, on the other hand, shows an example of a possible use of the quantum devices according to the first aspect. An interferometer 30 comprises an interferometer plate 31 and two slits 31.1 and 31.2 formed in a side-by-side relationship into the interferometer plate 31. Quantum devices 32.1 and 32.2 are inserted into the slits 31.1 and 31.2, respectively. It is assumed that the two quantum devices 32.1 and 32.2 both comprise an identical directional orientation and, moreover, a directional orientation such as that of the quantum device 10 as shown in FIG. 1.

Figure 6:
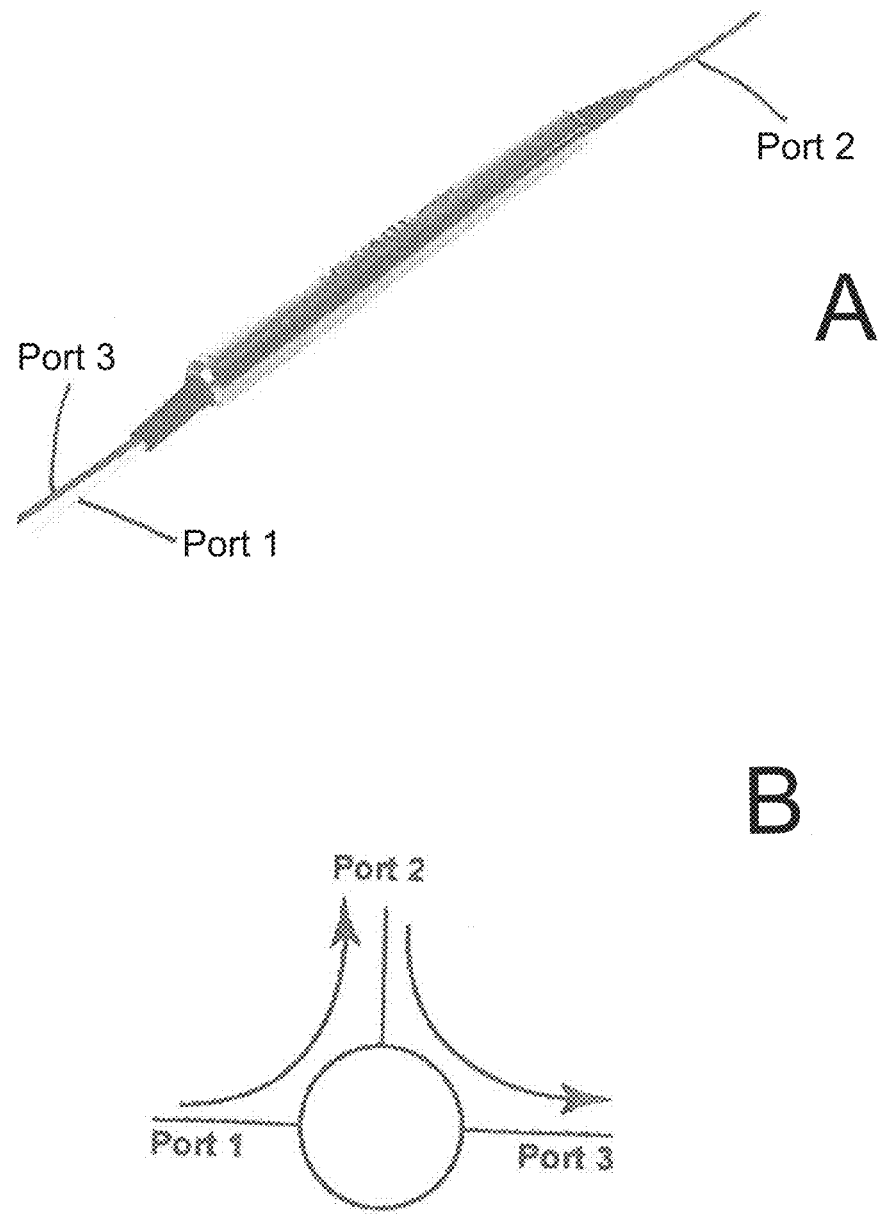
FIG. 6 comprises FIGS. 6A and 6B and shows a commercially available 3 ports optical circulator in a perspective representation (A) and in a schematic functional representation (B).

FIG. 6 comprises FIGS. 6A and 6B and shows a conventional commercially available optical 3-ports-circulator in order to illustrate the way in which the quantum devices could be inserted into the slits 31.1 and 31.2.

As can be seen in FIG. 6A, the optical circulator comprises the form of a fiber optical device comprising first and third ports 1 and 3 at the left lower end and a second port 2 at the right upper end. The sketch in FIG. 6B shows the possible paths of light waves in and out of the device. The designation of the ports corresponds to that of the embodiment of FIG. 1, i.e., light incident on the device from the left side has to be coupled into the device at port 1 and then leaves the device coherently at port 2, whereas light incident on the device from the right side is coupled into the device at port 2 and is then internally guided to port 3. There will be no external fiber connected to port 3. Instead at port 3 a black body radiator is provided at the left-side output of the device. Furthermore there is no need for a port 4 as was provided in the embodiment of FIG. 1. Two such circulators are provided and each one is inserted in one of the two slits of the interferometer. The fiber ends at port 2 are favorably have to be oriented in parallel so that they may properly work as a double-slit.

The quantum devices 32.1 and 32.2 could be realized according to one of the embodiments as shown in FIG. 1 or FIG. 3. As was indicated above, the quantum devices 31.1 and 31.2 could also be realized by inelastic scatterers like, e.g., a gas or a lightly opaque solid body or a cluster of scatterers.

It is further shown in FIG. 4B what happens when coherent radiation impinges onto the interferometer 30 from either sides of the interferometer plate 31. When the coherent radiation impinges from the right side onto the interferometer plate 31, i.e., the coherent waves pass through the quantum devices 32.1 and 32.2 in backward direction and thus realize them as pure black-body radiators. Consequently the coherent waves are absorbed in the black body radiators of the quantum devices 32.1 and 32.2 and incoherent radiation with random phases is emitted from either one of the quantum devices 32.1 and 32.2 and emanates from the two slits 31.1 and 31.2 to the left side of the interferometer plate 31 as indicated by the bubble-like radiation cones. On the other hand, if coherent radiation impinges onto the interferometer plate 31 from the left side, the coherent waves pass through the quantum devices 32.1 and 32.2 in forward direction so that the phases of the coherent waves are conserved. Consequently, the coherent waves emitted to the right side interfere constructively and lead to a typical double-slit diffraction pattern as shown in the Figure.

Figure 5:
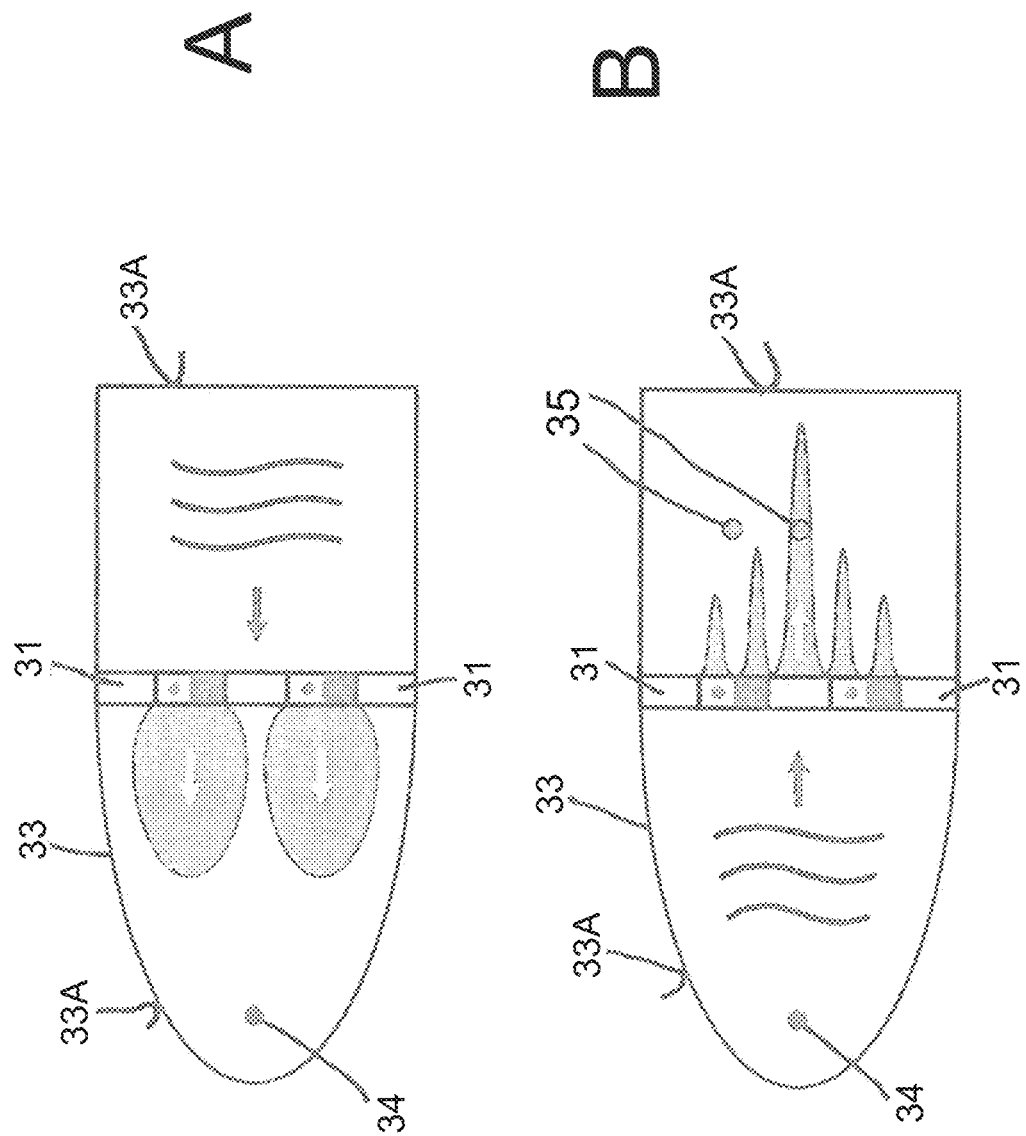
FIG. 5 comprises FIGS. 5A and 5B and shows the double-slit interferometer of FIG. 5B disposed in a cavity comprising reflecting walls in a situation in which coherent radiation impinges onto the interferometer in a backward direction with respect to the quantum devices (A), and in a forward direction with respect to the quantum devices (B).

FIG. 5 comprises FIGS. 5A and 5B and shows an extension of the interferometer 30 of FIG. 4B, which may lead to a useful device.

Basically the interferometer 30 is placed in a cavity 33 comprising walls 33A. The interferometer 30 is inserted in the cavity 33 in such a way that the interferometer plate 31 extends from one cavity wall to an opposing cavity wall and thus divides the interior of the cavity 33 into two half spaces, which are separated from each other by the interferometer plate 31. The walls 33A of the left half of the cavity 33 are provided by mirrors, whereas the walls 33A of the right half are black. The walls 33A are in thermal equilibrium with an external bath. The radiation coming from the left is generated by a particle 34 like e.g., a grain of carbon or a cluster of atoms that acts as a black-body radiator. In the case where wave fronts of the black-body radiation on the left side of the cavity 33 impinge the double-slits 31.1 and 31.2 with some degree of phase correlation, a double-slit diffraction pattern is created in the right half of the cavity 33 (see FIG. 5B). It should be noted that the phase coherence length of thermal radiation in a cavity is not defined in any manner by Planck's spectral radiation density It is noted that this behavior does not agree with the zeroth and the second law of thermodynamics, according to the manner these laws are today commonly understood and presented in the textbooks Indeed, for many decades it has been dreamed about which advantages a then still hypothetical device would entail that would violate the second law of thermodynamics Nevertheless, as known to the expert and to the layman, see e.g., FIG. 7 shows a further example of a possible application of quantum devices according to the first aspect.

Figure 7:
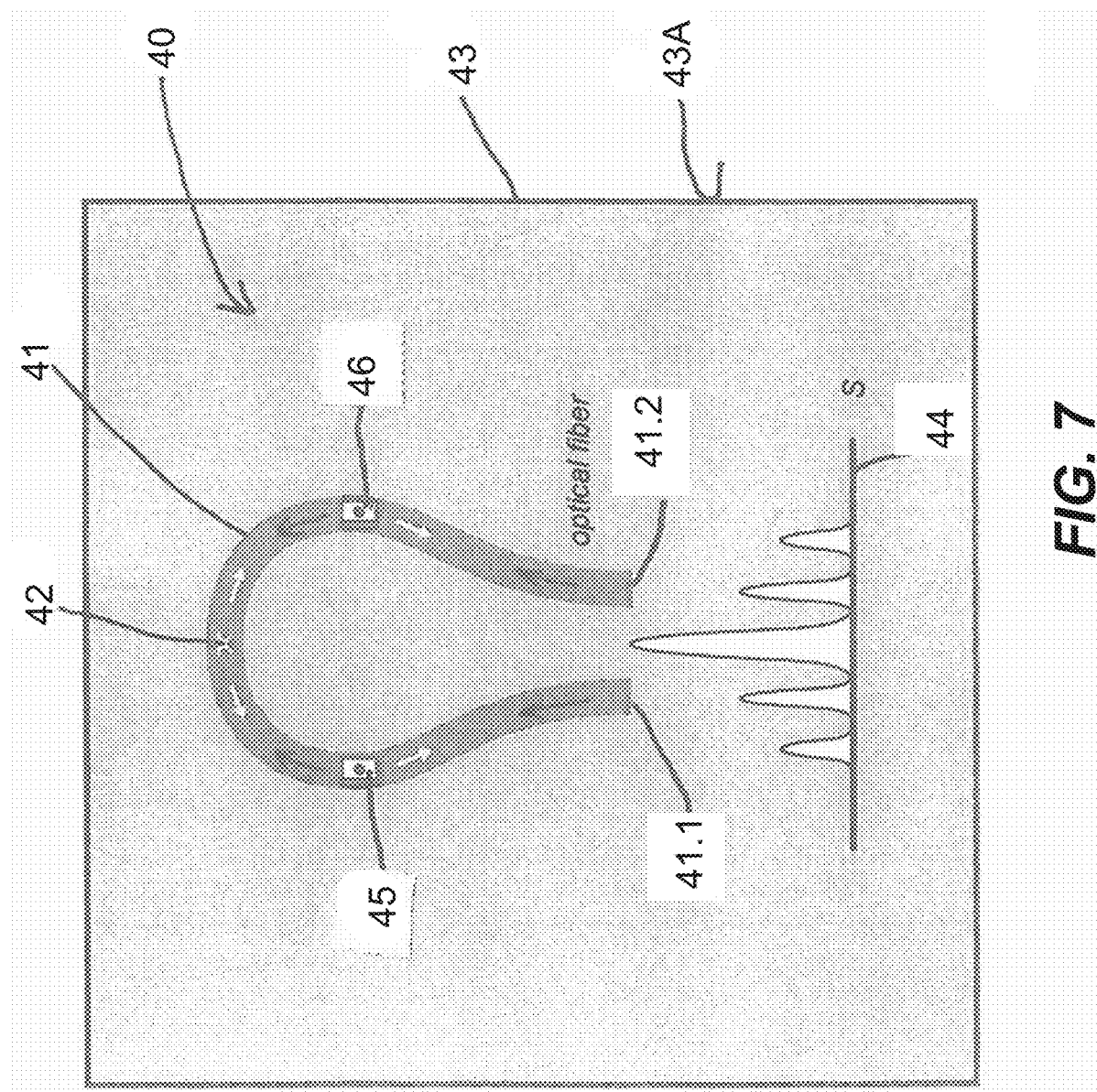
FIG. 7 shows a schematic representation of an interferometer comprising an optical fiber, two quantum devices according to the first aspect and one coherently radiating atom inserted in the optical fiber, and a screen for receiving an optical diffraction pattern.

FIG. 7 shows a further embodiment of an optical interferometer. The interferometer 40 of FIG. 7 comprises an optical fiber 41 incorporated into a cavity 43, the walls 43A of which are in thermal equilibrium with an external bath. In the middle of the length of the optical fiber 41 a particle like e.g., an atom 42 is embedded, which upon excitation may emit single photons such that each photon coherently propagates in both directions of the fiber. The atom 42 is anchored to a thermal bath. First and second quantum devices 45 and 46, provided according to the first aspect, are incorporated in the optical fiber 41 in such a way that in both radiation directions of radiation emitted by the atom 42 one quantum device 45 or 46 is arranged wherein the forward directions are directed downwards and the backward directions are directed upwards. The two quantum devices 45, 46 can be identical. Below the optical fiber 41 a screen 44 is provided, which receives the radiation output by the first and second output ends 41.1 and 41.2 of the optical fiber 41.

As indicated by the white and black arrows, there is radiation emitted by the atom 42, passing through the quantum devices 45, 46 and leaving the optical fiber 41 at its two ends 41.1 and 41.2 (white arrows), and radiation emanating from the screen 44 is coupled into the optical fiber 41, impinging there onto the quantum devices 45, 46, which then emit black body radiation impinging onto the atom 42 (black arrows).

In an ideal case the two waves being emitted by the atom 42 in both directions, pass undisturbed through the two quantum devices 45, 46 so that they are still coherent with each other with zero phase difference. In the case where the two wave fronts leave the two ends 41.1 and 41.2 of the optical fiber 41 with still at least some degree of phase correlation, a double-slit diffraction pattern is created on the screen 44. In the opposite direction, the screen 44 and the diffraction pattern generate coherent light waves being coupled into the optical fiber 41 by means of the two fiber ends 41.1 and 41.2. More specifically, the interference maxima of the diffraction pattern on the screen 44 generate coherent partial waves of zero phase difference in the optical fiber 41, and the interference minima of the diffraction pattern on the screen 44 generate coherent partial waves of a phase difference of $\pi$ in the optical fiber 41. The two coherent partial waves impinge onto the quantum devices

45, 46 and their wave functions collapse therein. As a consequence, waves with random phases are generated by the quantum devices 45, 46, which impinge onto and are absorbed by the atom 42. The atom 42 then starts again by generating coherent partial waves being emanated to the right and to the left and having a relative phase difference of zero.

Because absorbing test bodies (not shown) positioned inside and outside the diffraction peaks, respectively, receive different amounts of incoming radiation, the temperatures of these test bodies that are each in internal thermal equilibrium and that are initially in thermal equilibrium with the walls of the cavity will therefore start to differ. Again this temperature difference may be converted, e.g., by using a thermocouple device, into useful electric power. The device may obviously also be used to heat or to cool bodies, using as energy source the thermal energy of the heat bath.

The quantum devices 45 and 46 could be realized according to one of the embodiments as shown in FIG. 1 or FIG. 3. As was indicated above, the quantum devices 45 and 46 could also be realized by inelastic scatterers.

Figure 8:
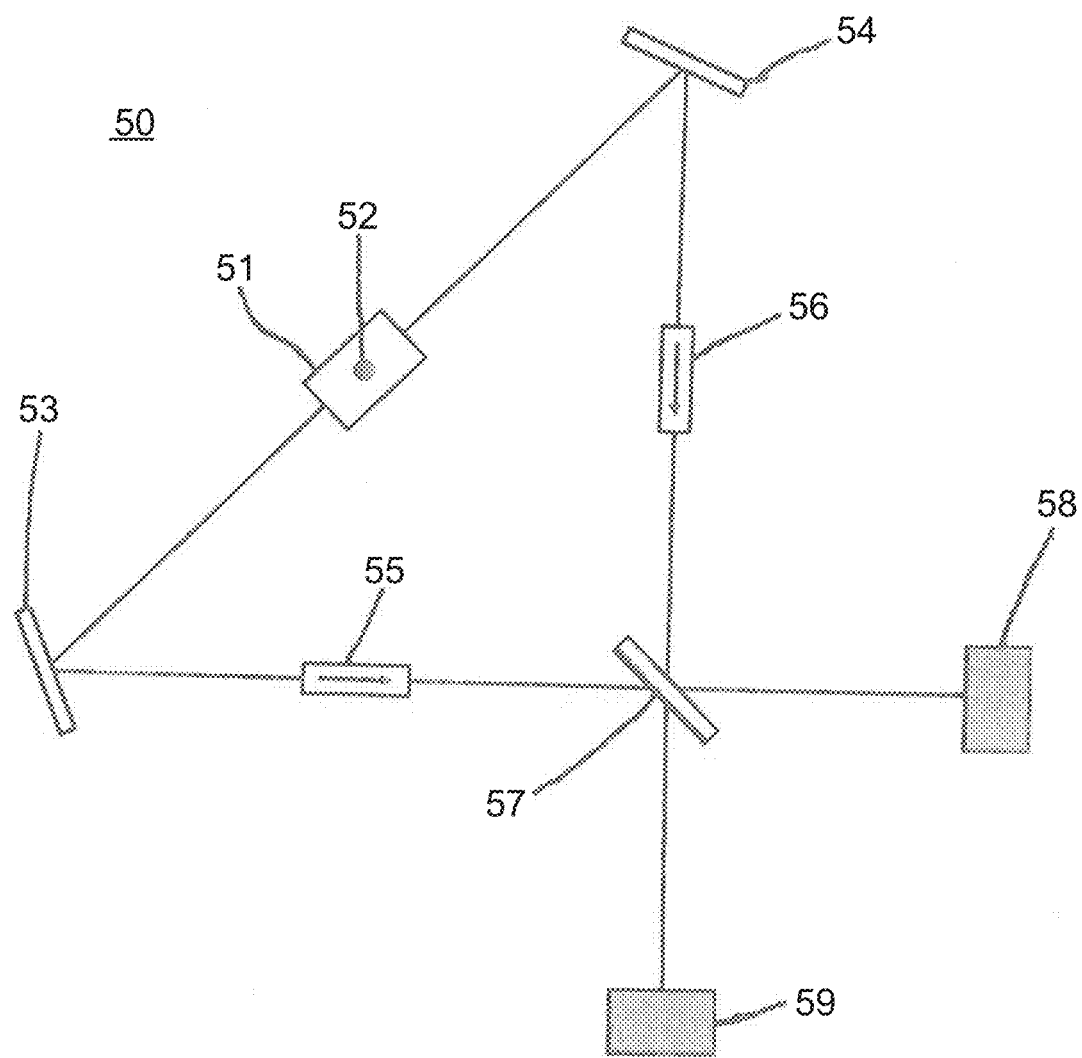
FIG. 8 shows a schematic representation of an interferometer comprising an optical light path comprising a coherently radiating atom, two highly reflecting mirrors collecting the coherent radiation, a semitransparent mirror, and two black body radiators.

FIG. 8 shows a further example of a possible application of quantum devices according to the first aspect.

FIG. 8 shows another form of an interferometer. The interferometer 50 of FIG. 8 comprises a mirrored cavity 51 with open ends housing a coherently radiating particle like e.g., an atom 52, first and second highly reflecting mirrors 53 and 54, two quantum devices 55 and 56, a semitransparent mirror 57 and first and second black body radiators 58 and 59. The atom 52 is anchored to a thermal bath. The two quantum devices 55 and 56 are configured as quantum devices according to the first aspect and can be identical. The arrows indicate their respective forward directions in which phase coherence is maintained.

The mirrored cavity 51 comprises two opposing openings for two light beams, respectively, passing out of the mirrored cavity 51 in two opposing directions. The first and second highly reflecting mirrors 53 and 54 deflect the two light beams onto two light paths, respectively, which two light paths join each other at the semitransparent mirror 57, i.e. an asymmetric beamsplitter, after having passed ideally undisturbed through the quantum devices 55 and 56. By orienting the metal coating of the semitransparent mirror 57 to the left side, the setup is configured such that light beams that come from the two quantum devices 55 and 56 without any phase difference are deflected only to the first black body radiator 58.

In the opposite direction the black body radiators 58 and 59 generate incoherent black body radiation, which impinges onto the semitransparent mirror 57. The semitransparent mirror 57 splits up the waves received from the black body radiators 58 and 59 into respective partial waves. These partial waves are pair-wise coherent with each other whereby the partial waves generated out of a wave emitted by black body radiator 58 comprise a phase difference of 0, and the partial waves generated out of a wave emitted by black body radiator 59 comprise a phase difference of $\pi$. The quantum devices 55 and 56 destroy the phase coherence of the partial waves and, in particular, erase the phase difference of $\pi$ between the partial waves resulting from the emission of black body radiator 59. The quantum devices 55 and 56 effect a collapse of the wave function, which means that due to quantum mechanics the arriving wave either passes through the quantum device 55 or through the quantum device 56. As a result, the wave impinges onto the atom 52 either from the right side or from the left side. If the wave is not getting absorbed by the atom 52, it impinges onto the beamsplitter 57, which deflects it to both black body radiators 58 and 59 in equal proportions on a statistical average.

The first and second black body radiators 58 and 59 initially are at equal temperatures and emit equal amounts of radiative power, but receive radiation of different powers. As a result, a temperature difference is generated between the first and second black body radiators 58 and 59, which can be used, for example, to generate electric power.

It should further be mentioned that the above-described quantum devices and their applications require some coupling to heat baths, which are at a T>0 K. In a simple case, the heat baths may be given by the black body radiators 58 and 59 and the black bodies in the quantum devices 55 and 56. The medium of such a heat bath can be solid, liquid or gaseous. The devices may extract energy from one or of several of the heat baths and transfer the heat energy, e.g., to one or several other heat baths.

It is also apparent that the above described devices can be implemented to operate in parallel to enhance their output. Likewise devices may be operated in series. For example, to the black body A1 of a first device that is cooled by this device, a second device may be thermally connected, such that the black body A2 of the second device becomes cooled to even lower temperatures than the body A1.

Figure 10A:
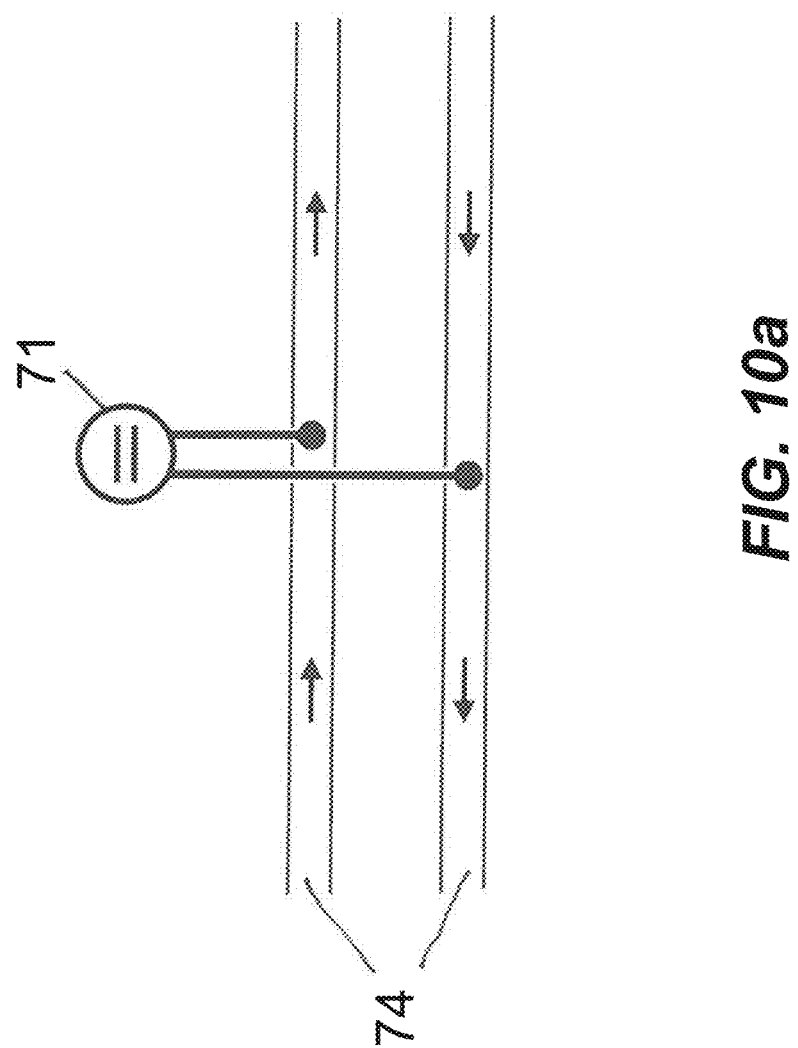
FIG. 10 comprises FIGS. 10(a) and 10(b) and illustrates the principle of a further example in which two level systems TLS couple non-symmetrically to the left- and right-moving channels of a chiral waveguide, wherein the TLS interact in a nonlinear manner with the photons travelling in the waveguide and break their phases with different strengths and the coupling between the TLS and the waveguides are therefore specified by two different coupling parameters g1 and g2 (a), and a device implementation of the principle shown in (a), wherein the waveguide is closed into a ring and is coupled to cavities A and B acting as black bodies (b).
Figure 10B:
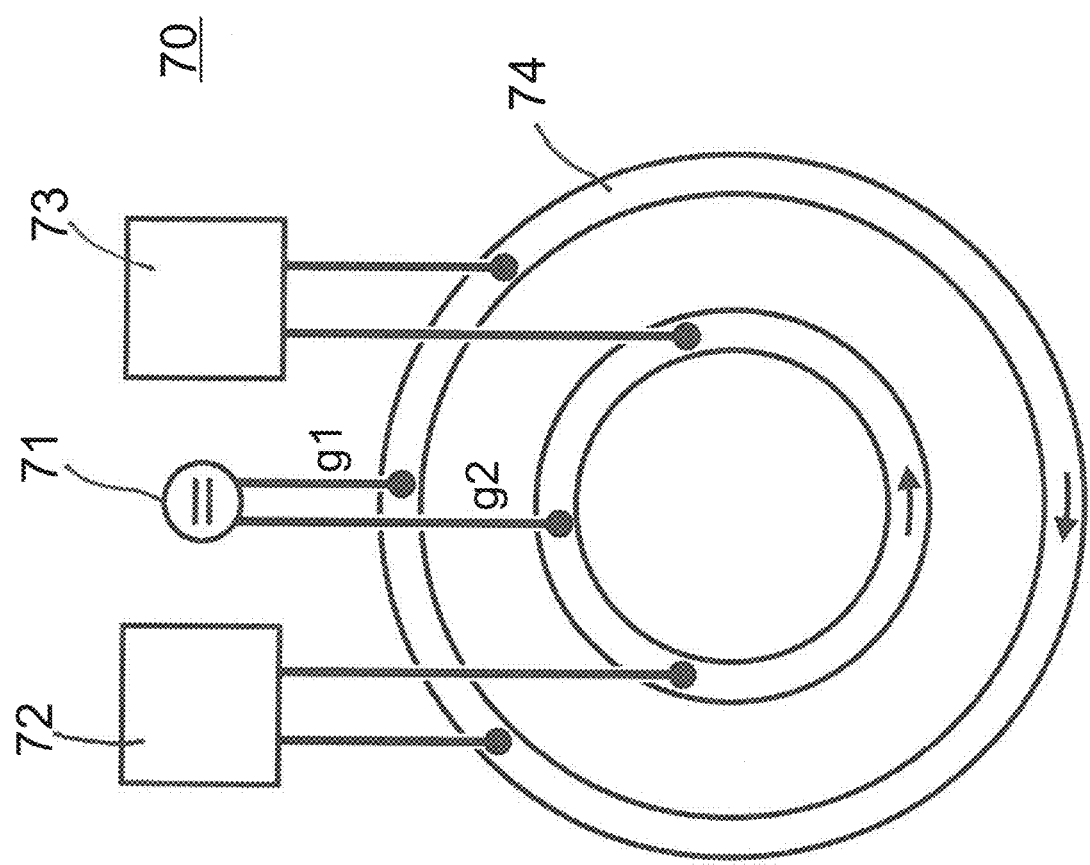

The quantum devices 55 and 56 could be realized according to one of the embodiments as shown in FIG. 1, FIG. 3, or FIG. 10. As was indicated above, the quantum devices 55 and 56 could also be realized by inelastic scatterers that scatter each with a probability p. If set up in the manner described, device operation is achieved, as the phase information of the coherent waves moving from the black body radiator 59 to the atom 52 and back to the black body radiator 59—these waves heat black body radiator 59 and are therefore detrimental for device operation—is reduced by a factor of $(1-p)\times(1-p)$, while the coherent wave generated by the atom 52 and moving to the black body radiator 58 is reduced by factor of p only. Also this embodiment may simultaneously act on the complete frequency spectrum of a black-body radiator.

Figure 9:
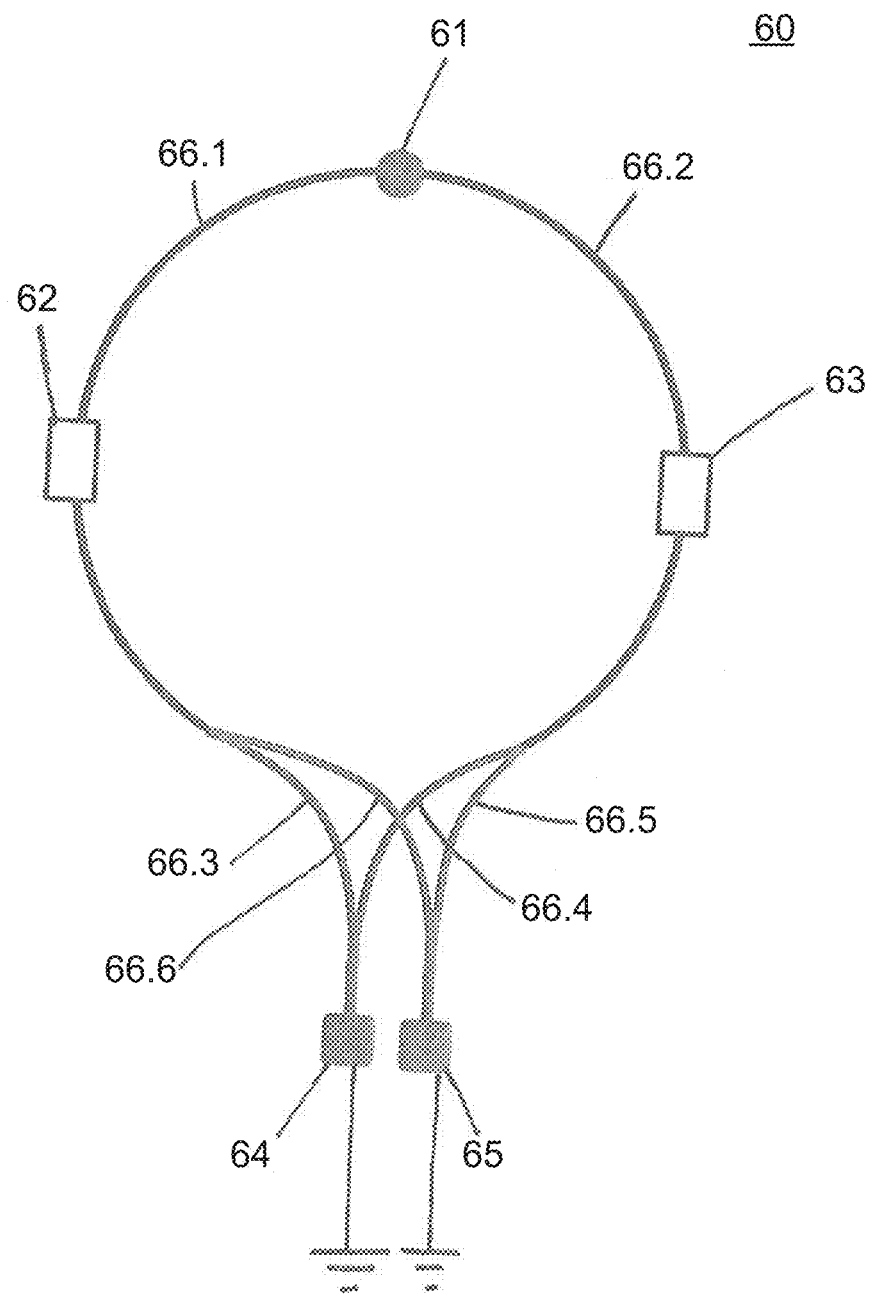
FIG. 9 shows a schematic representation of an example of an electronic interferometer comprising an electron source, two quantum devices, two resistors, and transmission paths connecting the electron source to the quantum devices and the quantum devices to the resistors.

FIG. 9 shows an example of the use of quantum devices in an electron interferometer. An electron interferometer 60 of FIG. 9 comprises an electron source 61, a first quantum device 62 and a second quantum device 63, a first resistor 64 and a second resistor 65, both first and second resistors 64 and 65 connected to ground. The interferometer 60 further comprises a first transmission path 66.1 connecting the electron source 61 with a first port of the first quantum device 62, a second transmission path 66.2 connecting the electron source 61 with a first port of the second quantum device 63, a third transmission path 66.3 connecting a second port of the first quantum device 62 with the first resistor 64, a forth transmission path 66.4 connecting a second port of the second quantum device 63 with the first resistor 64, a fifth transmission path 66.5 connecting the second port of the second quantum device 63 with the second resistor 65, and a sixth transmission path 66.6 connecting the second port of the first quantum device 62 with the second resistor 65.

The first and second resistors 64 and 65 function as electron absorbers and emitters. For effectively absorbing electrons they may have a resistance of 50 Ohm. The generating of electrons happens, for example, via the thermal noise, i.e. Johnson/Nyquist noise, which is due to the thermal agitation of the charge carriers inside an electrical conductor at equilibrium.

The interferometer 60 is configured in such a way that electron waves experience a phase shift $\alpha$ on the third, forth, and fifth transmission paths 66.3, 66.4, and 66.5, and electron waves experience a phase shift of $\alpha+\pi$ on the sixth transmission path 66.6.

The above phase shifts can be achieved by designing the transmission paths with the following lengths:
the third transmission path 66.3 comprises a length L1,
the fourth transmission path 66.4 comprises a length L2,
the fifth transmission path 66.5 comprises a length L3,
the sixth transmission path 66.6 comprises a length L4.
If $\lambda$ is the electron wavelength, then:
L1−L2=n, and
L4−L3=m, wherein
n is an integer multiple of $\lambda$, and
m is an integer multiple of $\lambda$ plus $\lambda/2$.

The electron source 61 corresponds to the atom 42 in the embodiment of FIG. 7 or to the atom 52 in the embodiment of FIG. 8. It can, for example, as well be an atom, which can absorb an electron and emit an electron. It can also be a crystal defect, which can as well absorb or emit electrons. In case of the emission of an electron, two partial electron waves are emitted, which propagate on the first and second transmission paths 66.1 and 66.2.

The quantum devices 62 and 63 can be identical and maybe configured as inelastic scattering centers as, for example, crystal defects or phonons coupled into a crystal. They could also be configured, for example, as low-loss electronic switches like, e.g., FETs.

The transmission paths 66.1 to 66.6 correspond to the beamsplitter 57 in the embodiment of FIG. 8.

FIG. 10 shows an implementation of the use of quantum devices according to the present disclosure in a photonic system. The photonic system 70 comprises an ensemble of two-level systems TLS 71, two black-body radiators 72 and 73, and a chiral waveguide 74. The two level systems 71 are coupled to the chiral waveguide 74 with two different coupling strengths g1 and g2 that depend on the propagation direction of the waves. Comparable couplings are described, for example, it is noted that the quantum devices as described in the present disclosure pass information preferably in the forward direction, and hinder the flow of information in the backward direction. This valuable functional behavior has obvious applications in data transmission and storage based on conventional or quantum systems. It offers, for example, the possibility that a user of a quantum system writes data into a quantum memory but is not able to retrieve data stored in this memory, or vice versa.

It is a further valuable aspect of the present disclosure that easy control can be established over the processes driven by the quantum collapse. The processes can be controlled, for example, by blocking a part of the transmission paths or by moving or turning one or more of the optical components. The systems may therefore be equipped with an input terminal for process control.

The present disclosure also relates to the following further aspects. These aspects refer to devices in which a quantum device according to the first aspect can be implemented so that the respective device fulfills a particular function as will be outlined in the following.

The present disclosure also relates to a device utilizing coherent emission and at least partial collapses of wave functions to achieve a deviation from one or more of the zeroth law, the second, or the third law of thermodynamics.

The present disclosure also relates to a device utilizing quantum-mechanical superposition of states and at least partial collapses of wave functions to achieve a deviation from the zeroth, the second, or the third law of thermodynamics.

The device according to any one of the above further aspects may operate at a temperature in the range of $10^{-6}$ K-4000 K.

The device according to any one of the above further aspects may not be coupled to or entangled with a bath in the quantum regime.

The present disclosure also relates to a device utilizing coherent emission and at least partial quantum-physical collapses of wave functions or quantum-mechanical superposition of states and at least partial collapses of wave functions to generate or to enhance inhomogeneities in the density of the energy distribution of waves or particles in a system. The energy distribution may be an energy distribution generated at least partially by thermal energy.

The present disclosure also relates to a device utilizing coherent emission and at least partial quantum-physical collapses of wave functions or quantum-mechanical superposition of states and at least partial collapses of wave functions to shift a system out of the state of thermal equilibrium.

The present disclosure also relates to a device utilizing coherent emission and at least partial quantum-physical collapses of wave functions or quantum-mechanical superposition of states and at least partial collapses of wave functions to generate temperature differences within one body or between several bodies.

In a device according to any one of the above further aspects phase shifts maybe induced by at least one non-reciprocal component of the device.

In a device according to any one of the above further aspects the at least partial quantum physical collapse of the wave function is achieved by the use of a macroscopic body, which may, for example, be a solid, a liquid, a gas, or a plasma.

In a device according to any one of the above further aspects the at least partial quantum physical collapse and an at least partial absorption of the wave function at a body is followed by a statistical reemission of a wave by the body.

In a device according to any one of the above further aspects an at least partially quantum physical collapsed wave is statistically replaced by another wave with a random phase.

In a device according to any one of the above further aspects the device creates useful work by converting a generated radiation density inhomogeneity or a generated temperature difference into electricity, radiation, optical energy, or other forms of energy, or by using the achieved order in some other manner.

In a device according to any one of the above further aspects the device transports mass, particles, energy, heat, momentum, angular momentum, charge, or magnetic moments within one body or between several bodies.

In a device according to any one of the above further aspects the device charges a storage system for energy, waves or matter, for example, a capacitor or a battery.

In a device according to any one of the above further aspects the device heats or cools bodies.

In a device according to any one of the above further aspects one or several of the bodies of the device are operated at another base temperature than room temperature, for example, by using an additionally provided heating or cooling function.

In a device according to any one of the above further aspects an internally or externally created signal is used to control the process.

The key elements contributing to the apparent violation of the second law are the generation of particle states split into multiple wave packets, the quantum mechanical collapse of the multiple wave-packet states, and the sorting of single and multiple wave-packet states by interference, where the latter step transfers the coherence properties of the wave packets into a useful output signal. These robust, single-particle processes are scalable, they function in a wide temperature range including high-temperatures, are compatible with a standard room-type environment, and can be implemented in a large variety of devices acting on many species of quantum waves, including electromagnetic, particle and quasiparticles waves.

The principle of devices that use coherent superposition of states and the collapse of wave functions enables, as proven by the examples presented, a complete new category of functions and applications of optical and electronic devices and circuits that hitherto have not been available. Future applications may, however, also include ones that differ from these described here, i.e., quantum computation, quantum communication, cryptography, quantum information storage, energy generation, and cooling. This principle will open novel possibilities, for example, for analog and digital devices, data processing, storage, and sensing. Quantum effects based on wave function collapse will also open novel possibilities for functional materials, for example, in catalysis.

While the present disclosure has been illustrated and described with respect to one or more implementations, alterations and/or modifications may be made to the illustrated examples without departing from the spirit and scope of the appended claims. In particular, with regard to the various functions performed by the above described components or structures (assemblies, devices, circuits, systems, etc.), the terms (including a reference to a "means") used to describe such components are intended to correspond, unless otherwise indicated, to any component or structure, which performs the specified function of the described component (e.g., that is functionally equivalent), even though not structurally equivalent to the disclosed structure, which performs the function in the herein illustrated exemplary implementations of the present disclosure.

What is claimed is:

1. A quantum device, comprising:
   a non-reciprocal transmission structure, wherein the transmission structure is designed such that for first waves traversing the transmission structure in a forward direction, phases of the first waves are at least partially conserved, and for second waves traversing the transmission structure in a backward direction, phases of the second waves are at least partially replaced by random phases such that phase conservation is more pronounced in the forward direction than in the backward direction.

2. The quantum device according to claim 1, further comprising:
   a first port and a second port;
   the transmission structure comprising at least two first transmission paths extending from the first port to the second port and at least two second transmission paths extending from the second port to the first port; and
   the transmission structure being further designed so that the first waves are split up into first partial waves propagating on the first transmission paths, and the first partial waves interfere at least in part at the second port, and
   the second waves are split up into second partial waves and the second partial waves interfere at least in part at the first port, wherein
   at least part of the first partial waves interfere more constructively than the second partial waves.

3. The quantum device according to claim 2, wherein a part of the first partial waves interfere essentially fully constructively at the second port and a part of the second waves interfere essentially fully destructively at the first port.

4. The quantum device according to claim 2, further comprising:
   a third port;
   an absorber/emitter disposed at the third port; and
   at least two third transmission paths extending from the second port to the third port.

5. The quantum device according to claim 4, wherein the second partial waves after propagating along the at least two third transmission paths interfere at least in part constructively at the third port so that they are at least partially absorbed by the absorber/emitter or at least partially replaced by waves of different phases.

6. The quantum device according to claim 2, further comprising:
   a four-port circulator comprising the first and second ports and furthermore a third port and one or several fourth ports; and
   at least one absorber/emitter being disposed at the third and fourth ports.

7. The quantum device according to claim 6, further comprising:
   the four-port circulator further comprising first and second hybrid couplers; and
   a phase shifter, wherein:
      the first hybrid coupler is coupled to the first and third ports, and the second hybrid coupler is coupled to the second and fourth ports;
      the first and second hybrid couplers are connected with each other; and
      the phase shifter is connected between the first and second hybrid couplers.

8. The quantum device according to claim 1, wherein the transmission structure comprises at least two black bodies possibly imposing phase alterations on the first waves being designed such that an action of the at least two black bodies on a phase can be time-wise altered in strength and this alteration is done in a sequence such that the phase of the forward-moving wave is conserved to a larger degree than the phase of the backward-moving wave.

9. The quantum device according to claim 8, wherein the action of the at least two black bodies is altered by moving or turning the at least two black bodies, or changing their properties by mechanical, electrical, magnetic, or optical means.

10. The quantum device according to claim 1, wherein the transmission structure comprises chiral elements, in particular, a chiral waveguide.

11. The quantum device according to claim 1, wherein the transmission structure is coupled to a two-level system with coupling strengths that depend on the direction of transmission in the transmission structure.

12. The quantum device according to claim 1, wherein at least part of the phases of waves travelling between ports are erased and replaced by random phases, using an action of non-phase conserving scattering events.

13. A method for operating a quantum device, the method comprising:
    supplying first waves to a non-reciprocal transmission structure of the quantum device, wherein:

the first waves comprise quanta with energies obtained from a thermal source or with energies E of order kT, such that kT/10<E<10 kT, T is a temperature of an environment, and the non-reciprocal transmission structure is designed such that for the first waves traversing the non-reciprocal transmission structure in a forward direction, phases of the first waves are at least partially conserved, and for second waves traversing the non-reciprocal transmission structure in a backward direction, phases of the second waves are at least partially replaced by random phases such that phase conservation is more pronounced in the forward direction than in the backward direction.

14. A method of using one or more quantum devices, the method comprising:
   at least partially conserving phases of first waves traversing a non-reciprocal transmission structure of the one or more quantum devices in a forward direction;
   at least partially replacing phases of second waves traversing the non-reciprocal transmission structure in a backward direction by random phases, phase conservation in the backward direction less pronounced than in the forward direction; and
   using the one or more quantum devices in one or more of:
      a device in which the first waves comprise quanta with energies obtained from a thermal source or with energies E of order kT, such that kT/10<E<10 kT, wherein T is a temperature of an environment;
      a device utilizing coherent emission and at least partial collapses of wave functions to achieve a deviation from one or more of the zeroth, the second, or the third law of thermodynamics;
      a device utilizing quantum-mechanical superposition of states and at least partial collapses of wave functions to achieve a deviation from one or more of the zeroth, the second, or the third law of thermodynamics;
      a device utilizing coherent emission and at least partial quantum-physical collapses of wave functions or quantum-mechanical superposition of states and at least partial collapses of wave functions to generate or to enhance inhomogeneities in a density of an energy distribution of waves or particles in a system;
      a device utilizing coherent emission and at least partial quantum-physical collapses of wave functions or quantum-mechanical superposition of states and at least partial collapses of wave functions to shift a system out of the out of a state of thermal equilibrium;
      a device utilizing coherent emission and at least partial quantum-physical collapses of wave functions or quantum-mechanical superposition of states and at least partial collapses of wave functions to generate temperature differences within one body or between several bodies;
      a device comprising an interferometer; and
      a device performing quantum computation, quantum data transmission, quantum data storage heating, cooling, matter transport, energy transport, or power generation.

15. The method according to claim 14, further comprising operating the device at a temperature in a range of $10^{-6}$ K-4000 K.

16. The method according to claim 14, wherein the device is not coupled to or entangled with a bath in a quantum regime.

17. The method according to claim 14, further comprising utilizing coherent emission and at least partial quantum-physical collapses of wave functions or quantum-mechanical superposition of states and at least partial collapses of wave functions to generate or to enhance inhomogeneities in the density of the energy distribution of waves or particles in a system.

18. The method according to claim 17, wherein the energy distribution is an energy distribution generated at least partially by thermal energy.

19. The method according to claim 14, further comprising introducing phase shifts by at least one non-reciprocal component of the device.

20. The method according to claim 14, further comprising using a macroscopic body to achieve the at least partial quantum-physical collapses of the wave functions, the macroscopic body comprising a solid, a liquid, a gas, or a plasma.

* * * * *